United States Patent [19]
Norin et al.

[11] Patent Number: 6,157,817
[45] Date of Patent: Dec. 5, 2000

[54] METHOD FOR IN-ORBIT MULTIPLE RECEIVE ANTENNA PATTERN TESTING

[75] Inventors: John L. Norin; Andrew B. Kopito, both of Hawthorne, Calif.

[73] Assignee: Hughes Electronics Corporation, El Segundo, Calif.

[21] Appl. No.: 09/244,575

[22] Filed: Feb. 4, 1999

[51] Int. Cl.[7] .................................................. H04B 17/00
[52] U.S. Cl. .......................... 455/67.1; 455/12.1; 455/25
[58] Field of Search ................................. 455/12.1, 13.1, 455/13.4, 25, 67.1, 67.5, 423, 424; 370/316

[56] References Cited

U.S. PATENT DOCUMENTS

| | | | |
|---|---|---|---|
| 4,754,496 | 6/1988 | Fishkin et al. | 455/67 |
| 4,862,514 | 8/1989 | Kedjierski | 455/161 |
| 5,187,805 | 2/1993 | Bertiger et al. | 455/12.1 |
| 5,758,260 | 5/1998 | Wiedeman | 455/12.1 |

OTHER PUBLICATIONS

Bernard Kasstan, "Recent Advances in 'In–Orbit' Communication Satellites", International Journal of Satellite Communication, vol. 13, pp. 377–401, 1995.

Kasstan, Bernard, "In–Orbit Testing of Communications Satellites: An Introduction", *International Journal of Satellite Communications*, Sep.–Oct. 1995, vol. 13, No. 5.

Egly et al., "In–Orbit Test of the First Hughes United States Direct Broadcast Satellite", *International Journal of Satellite Communications*, Sep.–Oct. 1995, vol. 13, No. 5, 301–312.

Kasstan, et al., "Recent Advances in In–Orbit Testing of Communications Satellites", *International Journal of Satellite Communications*, Sep.–Oct. 1995, vol. 13, No. 5, 377–401.

Moens, et al., ESA's In–orbit Test Facilities for Communications Satellites, *International Journal of Satellite Communications*, Sep.–Oct. 1995, vol. 13, No. 5, 403–412.

*Primary Examiner*—Edward F. Urban
*Assistant Examiner*—Blane J. Jackson
*Attorney, Agent, or Firm*—Terje Gudmestad

[57] ABSTRACT

A method of testing in-orbit communications satellite receive antennas from a single ground test station. The ground test station transmits an uplink test signal to the orbiting satellite. Telemetry circuitry onboard the satellite measures the power level of the uplink signal received and converts it to a corresponding digital value. The satellite's position is slewed over angles approximately covering the receive antenna areas of reception. The power level of the received uplink test signal and satellite orientation information are transmitted to the ground test station in the satellite's telemetry data stream. A computer at the ground test station plots the power level with respect to the satellite's corresponding orientation to map the receive antenna pattern. In an alternative embodiment, a plurality of receive antennas are tested simultaneously.

13 Claims, 5 Drawing Sheets

METHOD FOR IN-ORBIT MULTIPLE RECEIVE ANTENNA PATTERN TESTING

BACKGROUND OF THE INVENTION

1. Field of the Invention

This invention relates to in-orbit testing of communication satellites, and more particularly to in-orbit receive antenna pattern testing from a single location on the ground of a satellite having multiple receive antenna beams covering a large geographic area.

2. Brief Description of the Related Art

After a successful launch, it is essential to test a satellite's subsystems while it is in orbit and compare the results with prelaunch data to verify that the satellite is compliant with customer specifications. Testing of the transmit function in orbit allows the ground station to map the satellite's area of coverage to compare against coverage requirements for two reasons. First, to determine that the satellite is operational and has not been damaged during launch, and second, to verify that the satellite and its antennas are oriented so that each downlink beam area of coverage meets customer specifications.

A typical communications satellite consists of one or more uplink receive antennas for reception of signals, one or more downlink transmit antennas for return transmission, and complex electronics, referred to as a repeater, that receive and amplify the uplink signals before relaying them back to receiving stations on earth. Ground test stations are set up for execution of the in-orbit testing, which includes measuring and mapping the satellite's receive antenna performance to verify its integrity.

A brief history of in-orbit test procedures and facilities is described in Kasstan et al., "Recent Advances in 'In-Orbit Testing' of Communications Satellites", *International Journal of Satellite Communications,* Vol. 13, No. 5, September–October 1995, pages 377–401. Improvements to in-orbit testing over recent years have been in the area of equipment automation using computers; actual test procedures have remained basically the same. A ground station antenna forms the necessary interface to the satellite and the host computer maps the pattern of reception based on the uplink signal transmitted to and the downlink signal received from the satellite.

The receive antenna mapping procedure traditionally used for simple antenna systems was derived from the transmit antenna test. Basically, the transmit antenna test is performed using the satellite's on-board automatic level control (ALC) if available to level and amplify the uplink test signal, or by driving a non-linear high power amplifier slightly past saturation to provide a relatively constant downlink signal to produce a transmit pattern map. Then the test is repeated in a linear mode below saturation without the ALC function to generate a combined transmit+receive map. Subtracting the transmit component from the transmit+receive map results in a receive antenna pattern. The test is repeated for each receive antenna. For this test to work, the transmit and receive patterns must be similar in coverage.

Recent advances in satellite communications have resulted in satellites that have an increased number of smaller receive uplink and transmit downlink beams. Receive antenna beams allow uplink sites to transmit information from areas within the satellite's coverage. Increasing the number of receive antenna beams allows the customer to originate different information from various target areas with the potential of re-using the same frequency spectrum for the non-overlapping reception areas of different receive antennas. As the number of receive antennas and downlink beams increase, so must the complexity of the satellite circuitry, resulting in an increased number of in-orbit tests to be performed. For a design with uplink beams thousands of miles apart, a separate ground test station is required to test the satellite performance from each uplink region. To measure the downlink signal returned, multiple test sites may also be required. An uplink test signal is generated and transmitted from an uplink site. Downlink test sites within the areas covered by the downlink beams record the power level of the signals returned. The downlink test stations are often mobile stations that are able to measure signals returned in remote areas. The antenna pattern is then mapped by correlating the power of the signal returned with the location of the ground test station receiving it.

The test procedure for testing satellites with multiple receive beams is basically the same as for testing a satellite with only one receive beam. The primary difference is that, when testing multiple receive beams, the test procedure is repeated for each uplink antenna beam from a pair of ground test stations, one located in the coverage area of the receive antenna beam providing the uplink, and the other located within the coverage area of the antenna transmit beam. This increases the number of ground test stations required. In addition to being arduous and time consuming, it requires numerous ground test stations and qualified in-orbit testing experts.

SUMMARY OF THE INVENTION

The present invention provides a new and improved method of testing a complex multi-beam satellite receive antenna in-orbit from a single ground test station, thus reducing the time and cost to verify integrity of the antenna and compliance with customer specifications.

In one embodiment of the invention, a ground test station generates and transmits an uplink test signal to the receive antenna being tested. The power of the uplink signal is sensed onboard the satellite and converted to a corresponding digital signal for transmission back to the ground test station in the satellite's telemetry stream. The uplink signal and telemetry stream are transmitted continuously. The satellite is slewed in elevation and azimuth over an angle encompassing the receive antenna's area of reception. During slewing, the satellite's position is monitored by the telemetry circuit and reported in the telemetry data stream. The telemetry stream containing the uplink power measurement and the position information is received by the ground test station and stored for later processing to produce a map of the receive antenna pattern.

In an alternative embodiment, multiple receive antennas are tested from a single ground test station. Multiple uplink signals of various frequencies and polarizations are transmitted as the satellite is slewed. The power levels of the uplink signals received are measured and converted to digital signals for transmission in the satellite's telemetry stream. Testing multiple receive antennas reduces the time required to verify operation, resulting in a reduction in the total cost of performing the test.

The new in-orbit test method avoids the weight increase which would otherwise result from the installation of additional hardware for test purposes. It also significantly reduces the time and cost required to complete receive antenna tests on a satellite having multiple receive antennas.

These and further features and advantages of the invention will be apparent to those skilled in the art from the following detailed description, taken together with the accompanying drawings.

DETAILED DESCRIPTION OF THE INVENTION

Multi-beam communications satellites have at least one and typically multiple receive antennas, each with one or more feed horns. These are required to be tested after a successful launch. The satellite also has a repeater, multiple transmit antennas, and a wide angle antenna capable of transmitting the satellite's telemetry data stream. In normal operation, an uplink signal is received from an uplink site and converted to a downlink signal for broadcast by the transmit antennas over the desired area of coverage. Uplink signals contain the information which is to be broadcast within the area covered by the downlink beams. The repeater is the electronics between the output of the receive antennas and the input of the transmit antennas. Each combination of a receive antenna, the electronics associated with its desired frequency band (referred to as a channel), and a transmit antenna it feeds is referred to as a transponder.

Figure 1:
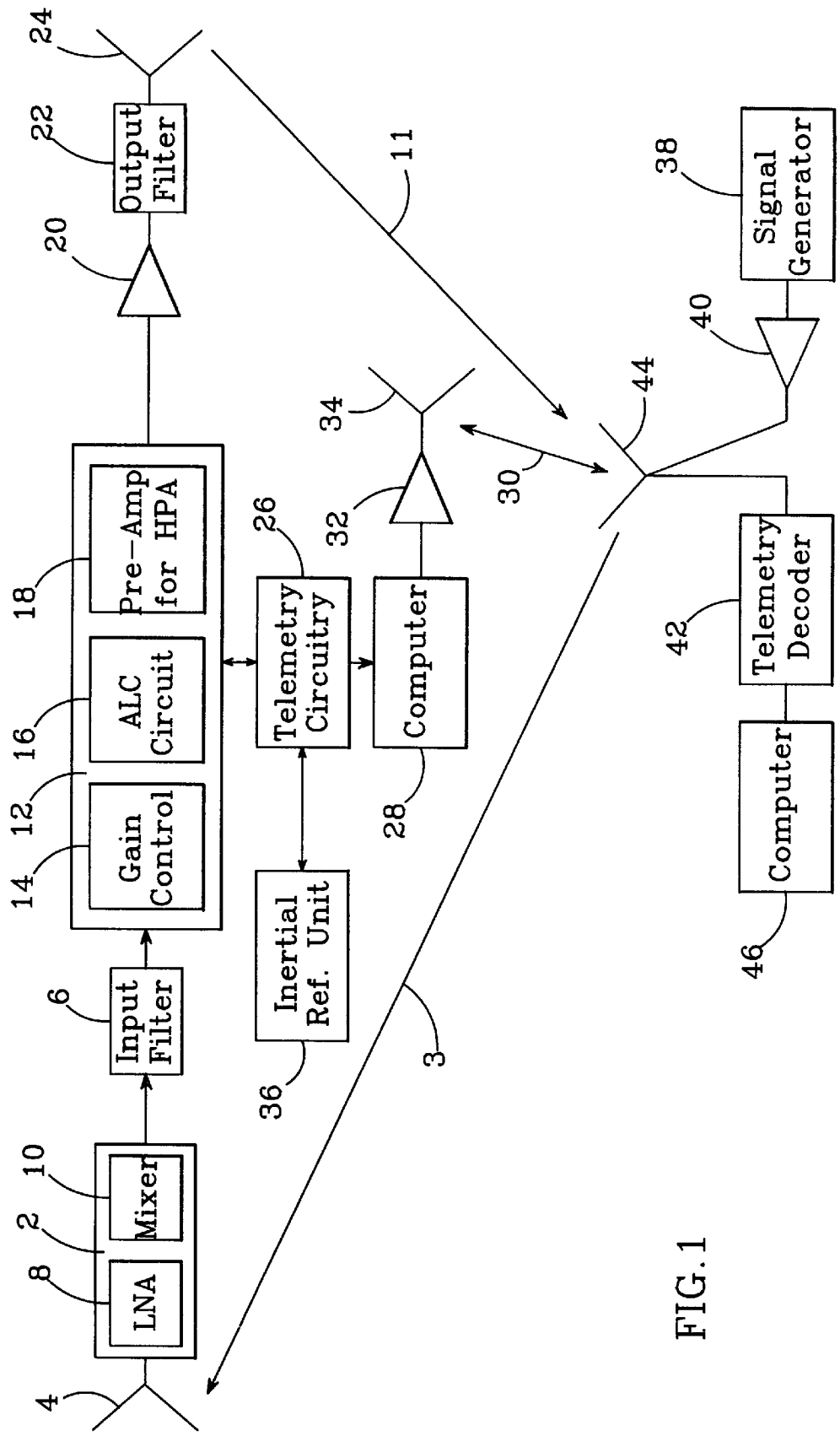
FIG. 1 is a block diagram of a sample satellite test configuration in accordance with the invention.

A schematic diagram of a sample communications satellite test configuration for a single receive antenna 4 is shown in FIG. 1. A receiver 2 is tuned to respond to uplink signals 3 within a desired frequency spectrum, referred to as an uplink band. Uplink signals are centered on frequencies that differ from the downlink signals to avoid interference. After the uplink signal 3 is received by the receive antenna 4, the input channel filter G removes signals not within the uplink band. Within receiver 2 a low noise amplifier 8 amplifies the uplink signal 3 while adding minimal noise, and a mixer 10 converts it to a corresponding downlink signal 11. A channel amplifier 12 typically includes a gain control 14 for controlling the gain of the amplifier, an automatic level control 16 to keep the downlink signal 11 constant when uplink signal 3 varies, and an amplifier 18 which drives a high power amplifier 20. When performing the new test method, the automatic level control 16 is turned off so that the signal power measurements reflect the actual power of the signals received. The high power amplifier 20 increases the power of the downlink signal 11, while an output channel filter 22 removes signals not within the downlink band prior to transmission back to earth via transmit antenna 24. This transponder configuration is described for the purpose of illustrating the receive antenna test method of the present invention, which is also applicable to other configurations.

In addition to transmitting downlink signals, satellites transmit a telemetry data stream which includes such information as satellite orientation, temperature, signal power, status and other data. Telemetry circuitry 26 onboard the satellite senses the power levels of the signals, and keeps track of the onboard equipment. The telemetry circuitry 26 converts the measurements to digital codes and computer 28 generates a telemetry data stream 30 containing the information. The telemetry data stream is amplified by amplifier 32 and relayed to Earth from a wide angle telemetry antenna 34. The orientation information may be received from an onboard inertial reference unit 36. The telemetry stream containing updated information is continuously transmitted. The telemetry antenna 34 also receives commands from ground sites so that in normal operation, the satellite can receive an uplink beacon transmitted from an uplink site to keep the satellite aligned as it orbits the earth. A wide angle telemetry antenna 34 is used so that the ground station can communicate with the satellite regardless of its orientation.

The ground test station shown in FIG. 1 includes a signal generator 38 for generating uplink test signals, an amplifier 40 to increase the power of the signal for transmission, and a decoder 42 to translate the telemetry data stream. A ground test antenna 44 provides the link between the in-orbit satellite and the ground test station. The test antenna 44 transmits the uplink signal to the satellite and receives the telemetry stream and downlink signal from the satellite. A computer 46 stores the translated position and signal information from the telemetry data stream for later processing. At the conclusion of the test, the computer plots the power levels of the received downlink signals as a function of the satellite's position to produce a map of the receive antenna pattern. The map is used to verify the integrity of the receive antenna after launch.

Figure 2:
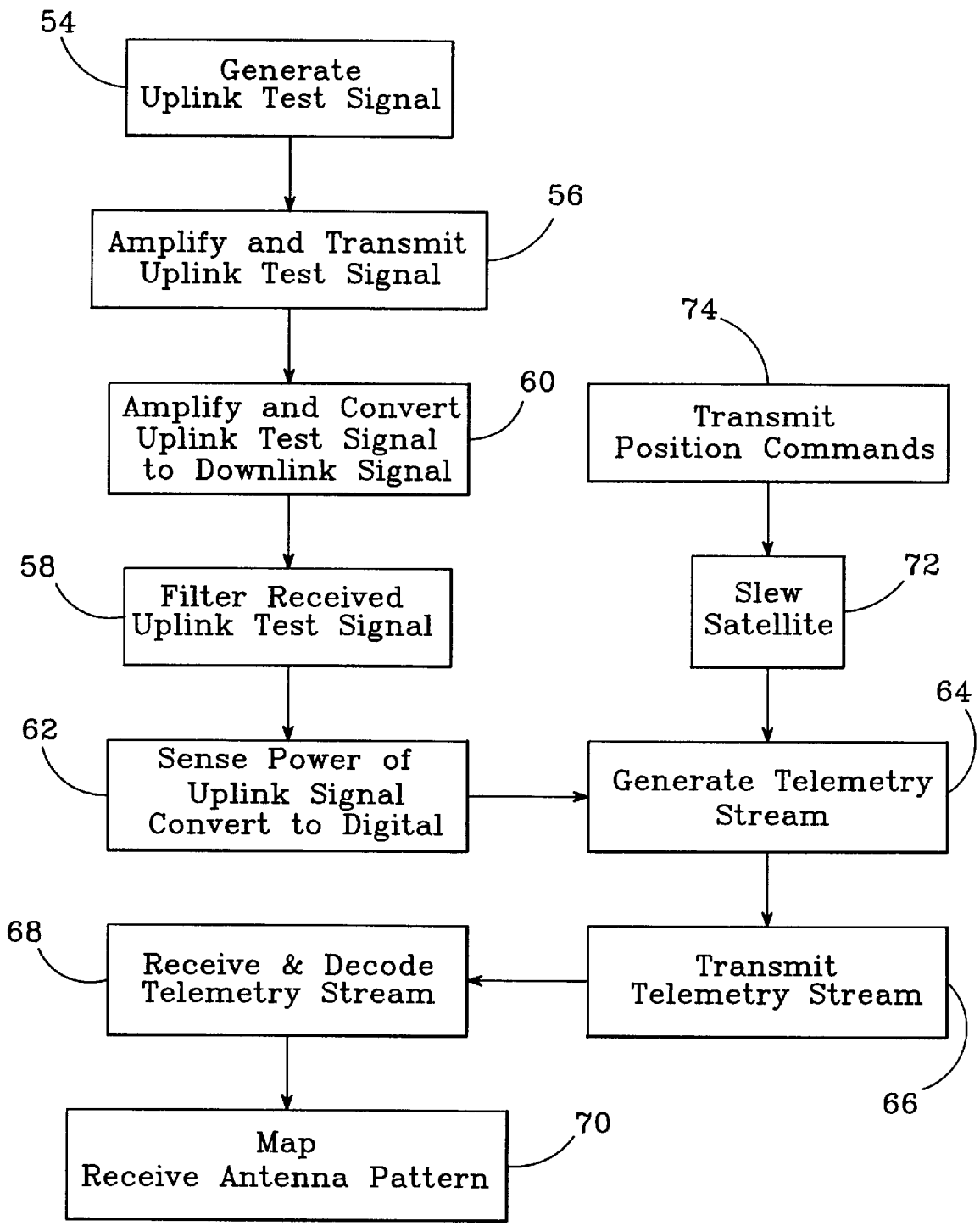
FIG. 2 is a flow diagram of the receive antenna pattern test method for the sample satellite of FIG. 1.

A flow diagram of an embodiment of the new receive antenna test method is shown in FIG. 2, which corresponds to the sample test configuration of FIG. 1. Signal generator 38 generates an uplink test signal 3 in step 54. In step 56 the uplink test signal is amplified and transmitted to the satellite receive antenna 4 from the ground test antenna 44. The received uplink test signal 3 is amplified and converted by receiver 2 to a corresponding downlink signal 11 in step 60, and then filtered by input channel filter 6 to remove other signals in step 58. Telemetry circuitry 26 senses the power level of the received test signal and converts it to a digital code in step 62.

As previously explained, the automatic level control 16 is not operational during the test because it would level the signal, resulting in a constant power level. The satellite's onboard computer 28 receives the digital code, generates an updated telemetry data stream 30, and transmits it to the ground test station via the wide angle telemetry antenna 34 in steps 64 and 66. The ground test station receives and decodes the telemetry data stream in step 68, and uses the information to map the receive antenna's area of reception in step 70. During the test procedure, the ground test station transmits a constant uplink test signal 3 to receive antenna 4 and the satellite transmits a corresponding telemetry data stream 30.

While the uplink test signal 3 is being received, the satellite position is slewed in step 72 over angles which encompass the area of reception of receive antenna 4.

Slewing is accomplished by incrementally adjusting the satellite roll (elevation) and pitch (azimuth) orientation. During the test, commands are transmitted in step 74 from the ground test station to the satellite, directing it to adjust its orientation. A wide angle telemetry antenna 34 is desirable for the new test method to allow a continuous transmission of telemetry data to be returned to the ground station as the satellite is slewed. Slewing an in-orbit satellite's position to validate the contour of a shaped antenna is described in Egly, et al., "In-Orbit Test of the First Hughes United States Direct Broadcast Satellite", *International Journal of Satellite Communications*, Vol. 13, No. 5, September–October 1995, pages 306–307.

Figures 3A, 3B, 3C, 3D, 3E:
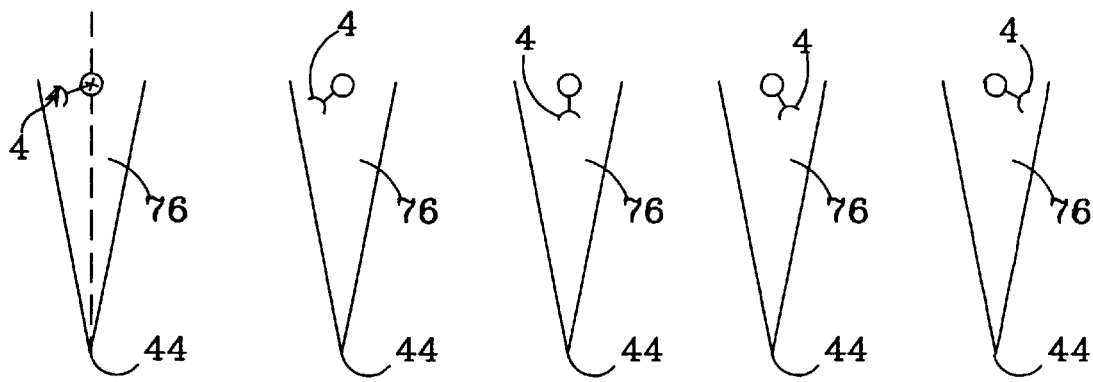
FIGS. 3a–3e are a series of plan views illustrating satellite rotation in azimuth.
Figure 3F:
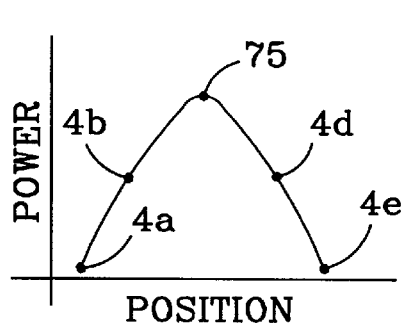
FIG. 3f is a graph of the power level of the uplink signal with respect to the satellite's position for the scan in FIGS. 3a–3e.

FIGS. 3a–3e illustrate the satellite's position within uplink beam 76 as the satellite is rotated in azimuth. These figures are for illustration and are not drawn to scale. In FIG. 3a, receive antenna 4 points away from ground test antenna 44. As the satellite is rotated, the antenna maximum gain points in a direction closer to alignment with the uplink signal source 44, as shown in FIG. 3b. The closer to alignment the antennas are, the greater the reception of uplink signals. In FIG. 3c the two antennas are aligned and the power level of the received uplink signals peaks. As the satellite continues to rotate counter-clockwise, shown in FIGS. 3d and 3e, antenna 4 points further and further away from test antenna 44 and its reception decreases. As the satellite's position is changed, the power level of the received uplink signal thus also changes. FIG. 3f is a graph of the power level of the received uplink signal with respect to the satellite's position for FIGS. 3a–3e. Peak power 75 corresponds to the aligned satellite position of FIG. 3c. For each incremental change in elevation, the satellite is typically rotated in azimuth as previously described. Its elevation remains constant as the satellite is rotated in azimuth. The elevation is then incrementally changed, and the satellite is again rotated in azimuth. This is repeated until the satellite's elevation is such that receive antenna is pointed outside its intended area of reception.

Figures 4A, 4B, 4C, 4D, 4E:
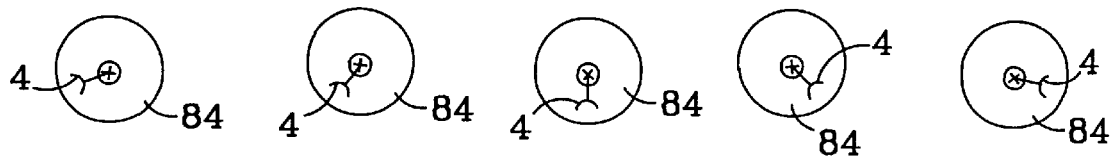
FIGS. 4a–4e are a series of plans views illustrating the satellite rotating in elevation.

FIGS. 4a–4e illustrate the satellite's elevational rotation. For the elevation position shown in FIG. 4a, the receive antenna is pointing away from the ground test station. As the satellite is incrementally rotated in elevation as previously described, receive antenna 4 moves closer to alignment with test antenna 44, as shown in FIG. 4b. Antennas 4 and 44 are aligned in FIG. 4c and the power level of the received signals is at its peak. As the satellite continues to rotate as shown in FIGS. 4d and 4e, the antenna 4 points progressively away from test antenna 44 and the power level again decreases. When the receive antenna 4 is aligned with the ground test antenna 44 in both azimuth and elevation, the power level of the received uplink signal is maximum.

Figure 5A:
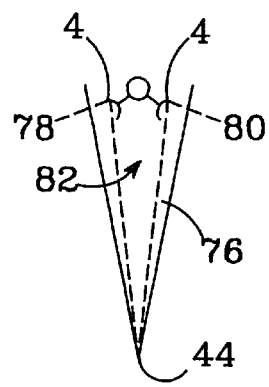
FIG. 5a is a plan view of a receive antenna area of reception within an uplink beam.

FIG. 5a illustrates a satellite rotation within an uplink beam 76 from a direction 78 at which where the receive antenna 4 first receives uplink signals, to a direction 80 where reception decreases back to zero. The area within uplink beam 76, is the receive antenna's area of reception 82.

Figure 5B:
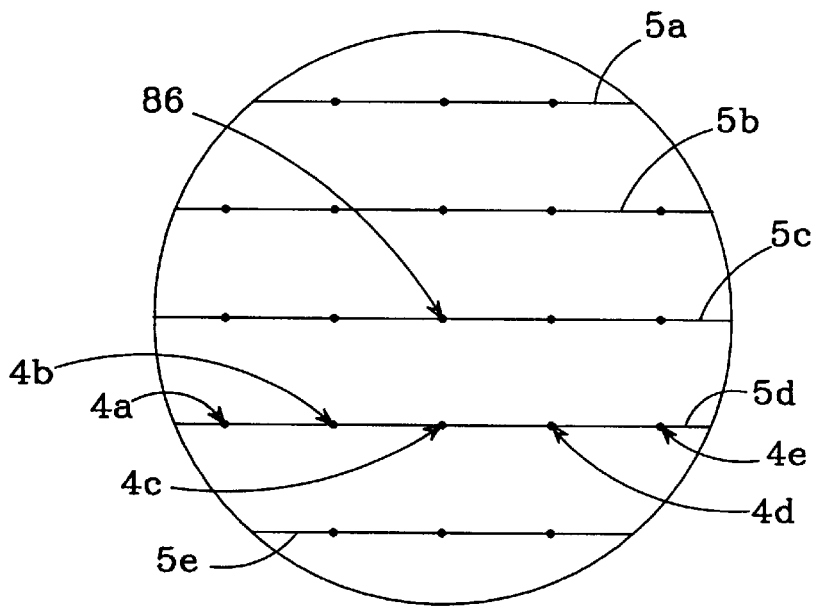
FIG. 5b is a diagram illustrating a typical scan pattern for the azimuth rotation of FIGS. 3a–3e and the elevational rotation of FIGS. 4a–4e in accordance with the invention.

FIG. 5b shows a sample scan pattern within the receive antenna's 4 area of reception. The horizontal lines correspond to the rotation in azimuth shown in FIGS. 3a–3e for a particular elevation, while the distance between horizontal lines represents incremental changes in elevation as shown in FIGS. 4a–4e. The distance between the lines has been exaggerated for purpose of illustration. At center point 86 the receive antenna and the ground test antenna are aligned in both azimuth and elevation.

The ground test station's computer 46 plots the received signal power at the ground station as a function of the satellite's position to produce a map of the receive antenna pattern. The resolution of the map is improved by increasing the number of scans.

Figure 6:
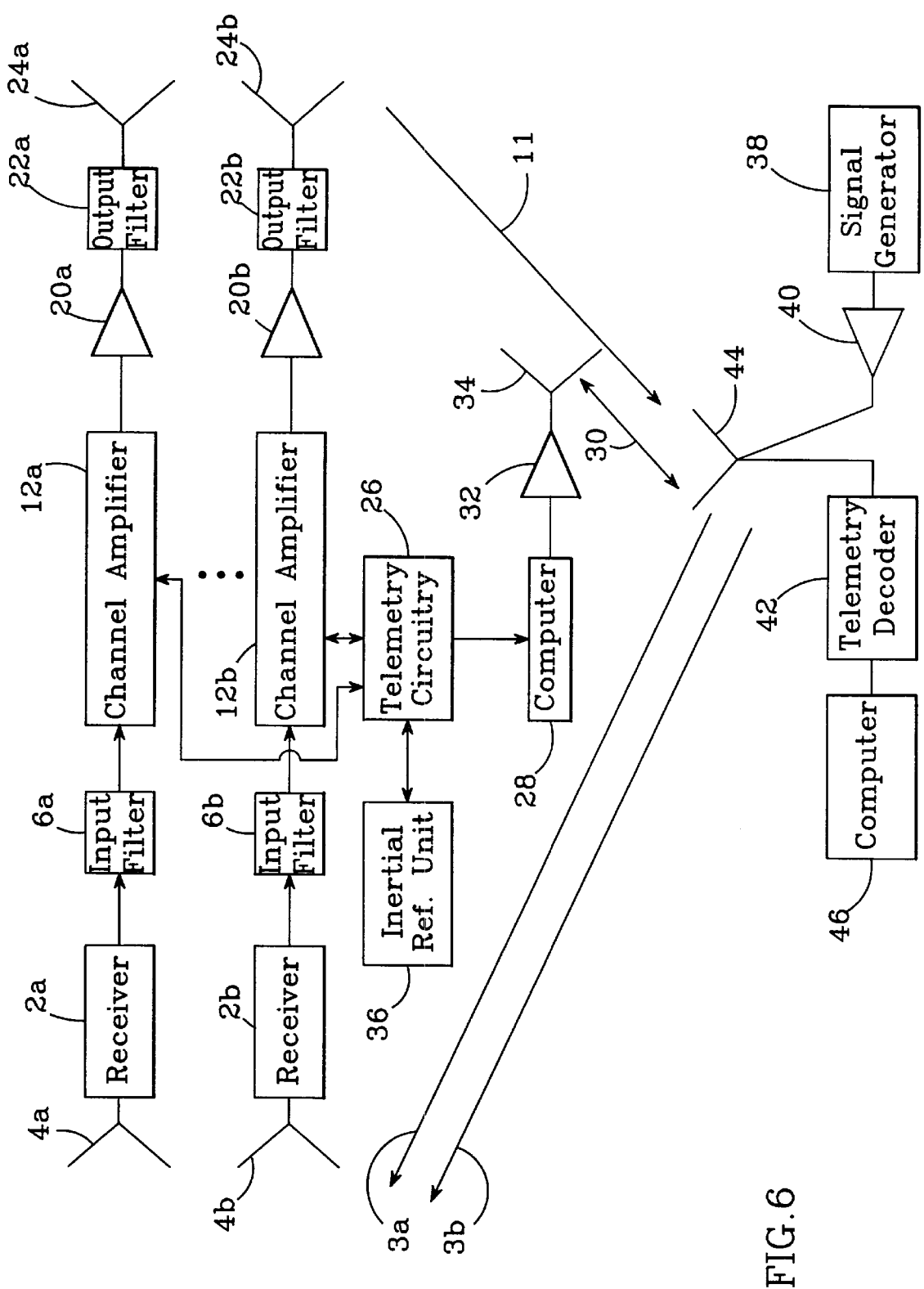
FIG. 6 is a block diagram of an alternative sample satellite test configuration in accordance with the invention.

In an alternative embodiment, multiple receive antennas are tested simultaneously from the same ground station. A sample test configuration with two transponders is shown in FIG. 6. Each channel is similar in design to that shown in FIG. 1, with corresponding elements labeled with the same reference numbers as in FIG. 1, plus an "a" for the first channel and a "b" for the second channel. As previously discussed, each channel responds to uplink signals of different respective frequencies. The new test method allows multiple receive antennas to be tested similtaneously. In this embodiment, the ground test station transmits multiple uplink test signals 3a and 3b with frequencies corresponding to the receive antennas being tested.

Figures 7A, 7B, 7C:
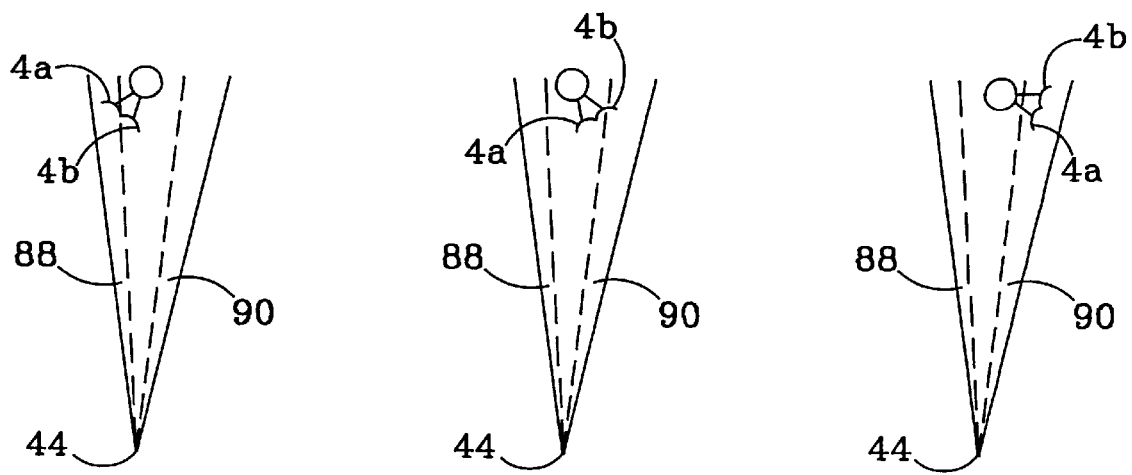
FIGS. 7a–7c are plan views illustrating the rotation in azimuth of a satellite in accordance with an alternative embodiment of the invention.

The satellite position is slewed over angles which encompass the receive antennas' collective area of reception. FIGS. 7a–7c illustrate uplink beams 88 and 90 simultaneously transmitted from ground test antenna 44 as a satellite having two receive antennas, 4a and 4b, is rotated in azimuth. As described above for a single receive antenna, as antennas 4a and 4b approach alignment with test antenna 44 the power level of their respective received uplink signals 3a and 3b increases. Telemetry circuitry 26 converts the sensed uplink signal power levels to digital code for transmission in the telemetry data stream 30 returned to the ground test station during slewing. The two receive antenna patterns are mapped as described for the single antenna test method. This allows multiple receive antennas to be tested simultaneously from a single ground test station, reducing the time required to complete the tests.

In another embodiment of the invention, the two receive horns respond to uplink signals having different polarizations, one with right-hand rotation and the other with left-hand rotation. Polarization of RF signals is described in Schrank, et al., 'Reflector Antennas', Radar Handbook, Second Edition, 1990, McGraw-Hill Publishing Company, page 6.10. The new test method may be used to test both receive horns simultaneously.

When testing receive antennas having this configuration, each polarization is tested separately. First, an uplink test signal with one polarization, such as right-hand circular, is transmitted to the satellite receive antenna. The receive horn for that polarization is tested following the new test method previously described. The test is then repeated by transmitting an uplink test signal having an opposite polarization, left-hand circular in this example. Alternately, two uplink test signals can be transmitted at different frequencies, each frequency corresponding to an opposite polarization, to allow both receive horns to be tested simultaneously. Although this embodiment has been described for right-hand and left-hnd circular polarization, the same method is used to test receive horns having other polarizations, such as vertical and horizontal.

The receive antenna patterns are used to verify the integrity of the antennas after launch. Satellite transmit antennas are mapped in a similar manner. The transmit antenna patterns may be used to position the satellite for optimal transmission with the areas of coverage of multiple downlink beams. When a satellite reflector contains both receive and transmit horns, adjusting the position of the transmit beams also changes the position of the receive beams.

In one mode of satellite operation, it is desired that the satellite point in the direction referenced by an uplink beacon transmitted from the ground. In this mode, a spinning momentum wheel onboard the satellite rotates the satellite as it is orbiting the earth to keep the antennas pointed in the proper direction. The beacon signal and momentum wheel form a closed loop system, and are used to reposition the satellite to its proper orientation after completion of the new test. During the test, the beacon signal is not utilized. Other systems for orienting the satellite will be apparent to those skilled in the art.

Current test procedures require each receive antenna to be tested separately by transmitting an uplink test signal in one uplink beam at a time, and monitoring the signal returned within the area of coverage of at least one substantially congruent downlink beam. The test would be repeated from each uplink beam. As the number of receive antennas increases, so does the number of tests that are required to be performed from various uplink sites.

An advantage of the new test method is that multiple receive antenna beams can be tested from a single ground station, thus reducing the time and cost to verify satellite performance. Another advantage is its use of the existing repeater on the satellite. Using the satellite's telemetry circuitry to sense and relay the uplink test signal's power level reduces the cost of performing the test, without significantly increasing the cost or weight of the satellite.

The satellite configuration shown in FIG. 1 is illustrated for the purpose of explaining the method of testing multibeam satellites from a single ground test station. The configuration may be modified by using a different number of receive antennas, as well as by using different repeater hardware to sense the uplink test signal's power level. Similarly, although the new method was illustrated as being performed from a single ground test station, a separate uplink site and ground test station could be used. Although specific embodiments were illustrated, numerous variations and alternative embodiments will occur to those skilled in the art. Such variations and alternatives are contemplated, and can be made without departing from the spirit and scope of the invention as defined in the appended claims.

We claim:

1. A method of testing a satellite receive antenna from a single ground test station, comprising the steps of:

transmitting an uplink test signal to a receive antenna on said satellite from said ground test station, slewing said satellite over orientation angles encompassing said receive antenna's coverage area, sensing a power level of said uplink test signal onboard said satellite during said slewing, transmitting said sensed power level and said orientation angles from said satellite to said ground test station, and using said sensed power level and said orientation angles to verify the operation of said receive antenna on said satellite.

2. The in-orbit receive antenna test method of claim 1, wherein said slewing includes transmitting orientation commands to said satellite and orienting said satellite in accordance with said commands.

3. A method of testing a satellite receive antenna from a single ground test station, comprising the steps of:

transmitting an uplink test signal to a receive antenna on said satellite from said ground test station, slewing said satellite over angles encompassing said receive antenna's coverage area, sensing a power level of said uplink test signal onboard said satellite during said slewing, transmitting said sensed power level from said satellite to said ground test station, transmitting satellite orientation information corresponding to said sensed power level to said ground test station, and using said sensed power level and said orientation information to verify the operation of said receive antenna on said satellite.

4. The in-orbit receive test method of claim 3, wherein said using includes mapping a receive antenna pattern from said sensed power level and said satellite orientation information corresponding to said sensed power level.

5. A method of testing a satellite receive antenna from a single ground test station, comprising the steps of:

transmitting an uplink test signal to a receive antenna on said satellite from said ground test station, slewing said satellite over angles encompassing said receive antenna's coverage area, sensing a power level of said uplink test signal onboard said satellite during said slewing, transmitting said sensed power level from said satellite to said ground test station, and using said sensed power level to verify the operation of said receive antenna on said satellite, wherein said sensed power level is stored on the satellite during said slewing, and thereafter transmitted from said satellite to said ground test station.

6. A method of testing multiple in-orbit receive antennas for a satellite having a plurality of receive antennas from a single ground station, comprising the steps of;

transmitting a plurality of uplink test signals from said ground station, said plurality of uplink test signals having frequency spectrums which correspond to said plurality of receive antennas, slewing said satellite over orientation angles encompassing said plurality of receive antennas' cover areas, sensing a plurality of power levels of said uplink test signals onboard said satellite during said slewing, transmitting said plurality of sensed power levels and said orientation angles from said satellite to said ground station, and using said sensed power levels and said orientation angles to validate the operation of said plurality of receive antennas on said satellite.

7. The in-orbit receive antenna test method of claim 6, wherein said slewing includes transmitting orientation commands to said satellite and positioning said satellite in accordance with said commands.

8. A method of testing multiple in-orbit receive antennas for a satellite having a plurality of receive antennas from a single ground station, comprising the steps of;

transmitting a plurality of uplink test signals from said ground station, said plurality of uplink test signals having frequency spectrums which correspond to said plurality of receive antennas, slewing said satellite over angles encompassing said plurality of receive antennas' cover areas, sensing a plurality of power levels of said uplink test signals onboard said satellite during said slewing, transmitting said plurality of sensed power levels from said satellite to said ground station, transmitting satellite orientation information corresponding to said sensed power levels, and using said sensed power levels and said satellite orientation information to validate the operation of said plurality of receive antennas on said satellite.

9. The in-orbit receive antenna test method of claim 8, wherein said using includes mapping a plurality of receive antenna patterns from said sensed power levels and said satellite orientation information.

10. A method of testing multiple in-orbit receive antennas for a satellite having a plurality of receive antennas from a single ground station, comprising the steps of;

transmitting a plurality of uplink test signals from said ground station, said plurality of uplink test signals having frequency spectrums which correspond to said plurality of receive antennas, slewing said satellite over angles encompassing said plurality of receive antennas' cover areas, sensing a plurality of power levels of said uplink test signals onboard said satellite during said slewing, transmitting said plurality of sensed power levels from said satellite to said ground station, and using said sensed power levels and said satellite orientation information to validate the operation of said plurality of receive antennas on said satellite, wherein said sensed power level is stored on the satellite during said slewing, and thereafter transmitted from said satellite to said ground test station.

11. A method of performing in-orbit receive antenna pattern measurements for a satellite from a single ground test station, comprising the steps of transmitting an uplink test signal in an uplink beam to at least one receive antenna on said satellite from said ground test station, transmitting a series of position commands to said satellite from said ground test station to rotate said satellite to orientation angles within said uplink beam, sensing a power level of said uplink test signal as received by said receive antenna onboard said satellite during said satellite rotation, converting said sensed power level and said orientation angles to a corresponding digital code, transmitting a telemetry stream which includes said digital code from said satellite to said ground test station, and mapping said at least one receive antenna pattern from said telemetry stream.

12. A method of performing in-orbit receive antenna pattern measurements for a satellite from a single ground test station, comprising the steps of:

transmitting an uplink test signal in an uplink beam to at least one receive antenna on said satellite from said ground test station, transmitting a series of position commands to said satellite from said ground test station to rotate said satellite within said uplink beam, sensing a power level of said uplink test signal as received by said receive antenna onboard said satellite during said satellite rotation, converting said sensed power level to a corresponding digital code, transmitting a telemetry stream which includes said digital code from said satellite to said ground test station, transmitting satellite position information corresponding to said sensed power level in said telemetry data stream to said ground test station from said satellite, and mapping said at least one receive antenna pattern from said telemetry stream and said satellite position information.

13. The in-orbit receive antenna pattern measurement method of claim 12, wherein said mapping includes using said satellite position information and said sensed power level to plot said at least one receive antenna pattern.

* * * * *